United States Patent [19]

Greving et al.

[11] Patent Number: 5,323,165
[45] Date of Patent: Jun. 21, 1994

[54] TWO-FREQUENCY TRANSMITTING APPARATUS WITH TONE-MODULATION PHASING FOR AN INSTRUMENT LANDING SYSTEM

[75] Inventors: Gerhard Greving, Untergruppenbach; Werner Poschadel, Kornwestheim, both of Fed. Rep. of Germany

[73] Assignee: Alcatel Sel Aktiengesellschaft, Stuttgart, Fed. Rep. of Germany

[21] Appl. No.: 79,958

[22] Filed: Jun. 18, 1993

Related U.S. Application Data

[63] Continuation-in-part of Ser. No. 23,071, Feb. 26, 1993, abandoned.

[30] Foreign Application Priority Data

Feb. 29, 1992 [DE] Fed. Rep. of Germany ....... 4206327
Jun. 19, 1992 [DE] Fed. Rep. of Germany ....... 4220101

[51] Int. Cl.$^5$ .......................... G01S 1/16; G01S 1/18
[52] U.S. Cl. .................................. 342/413
[58] Field of Search ............... 342/410, 411, 412, 413, 342/414

[56] References Cited

U.S. PATENT DOCUMENTS

3,887,922 6/1975 Hofgen et al. .

FOREIGN PATENT DOCUMENTS

1062551 3/1967 United Kingdom .

OTHER PUBLICATIONS

Herausgegeben von Ernst Kramar; "Funksysteme für Ortung und Navigation"; 1973; pp. 197–209; published by Verlag Berliner Union GmbH Stuttgart, and Verlag W. Kohlhammer GmbH, Stuttgart Berlin Köln Mainz.

Primary Examiner—Theodore M. Blum
Attorney, Agent, or Firm—Frishauf, Holtz, Goodman & Woodward

[57] ABSTRACT

Two-frequency transmitting apparatus (S1, S2, LA) for instrument-landing systems is insensitive to so-called difference in depth of modulation (DDM) distortions caused by reflections of a clearance signal from obstacles (H) located near the runway (RW). This insensitivity is achieved by providing different phase shifts to the equal modulation frequencies (90 Hz and 150 Hz) used for the course and clearance signals. The different phase shifts correspond to a phase shift of a common fundamental frequency (30 Hz). The two-frequency transmitting apparatus can be used to specify a localizer course or a glide path.

20 Claims, 4 Drawing Sheets

TWO-FREQUENCY TRANSMITTING APPARATUS WITH TONE-MODULATION PHASING FOR AN INSTRUMENT LANDING SYSTEM

This application is a continuation-in-part of application Ser. No. 08/023,071, filed Feb. 26, 1993, now abandoned.

FIELD OF THE INVENTION

The present invention relates to two-frequency transmitting apparatus for use in instrument landing systems (ILS), mainly for carrying out so-called Category III landings.

DESCRIPTION OF THE PRIOR ART

Two-frequency instrument landing systems are described, for example, in a book by E. Kramer, "Funksysteme für Ortung und Navigation", published by Verlag Berliner Union GmbH, Stuttgart, and Verlag W. Kohlhammer GmbH, Stuttgart, Berlin, Köln, Mainz, 1973, particularly in Section 5.9.2, pp. 196 et seq.

As indicated in the above-mentioned book by E. Kramer, the ground equipment of a two-frequency instrument landing system consists of a localizer portion for guiding an aircraft to an airport and for providing azimuth guidance during landing, a glide-slope portion for providing vertical guidance until touchdown on the runway, and two marker beacons for transmitting coarse distance information. At least the localizer portion consists of two separate transmitters operating with a slight difference in their carrier frequencies (thus, the system is a two-frequency system). Frequently, the glide-slope portion is also designed as such a two-frequency system.

According to the regulations of the International Civil Aviation Organization (ICAO), one of the localizers in the two-frequency localizer equipment radiates a so-called clearance signal of a predetermined minimum field strength within ±35° form the (extended) runway centerline, and the other localizer radiates a sharply defined course signal in the direction of the runway centerline. The two signals differ slightly in carrier frequency and are each modulated with two (first and second) audio frequencies (90 Hz, 150 Hz). The audio frequencies used for modulation are equal for the clearance and course signals and are generally in phase and their respective depths of modulation are initially equal. The transmitting antennas are so designed, however, that the radiation fields formed on both sides of the centerline contain one or the other of the first and second modulation frequency in a higher measure, so that along the centerline and its extension, a vertical plane is defined along which the modulation components of the two audio frequencies are equal, so that their difference becomes zero. On both sides of this plane, a receiver, by comparing the modulation components, can derive a DDM criterion (DDM=difference in depth of modulation) which indicates on which side of the plane the receiver is located, and which additionally indicates the distance to this plane within a small angular range near this plane.

In the receiver, the slight difference between the carrier frequencies of the clearance signal and course signal causes the respective stronger incoming signal to disproportionately suppress the weaker incoming signal, which is the so-called capture effect. The field-strength ratio between the clearance signal and the course signal is referred to as the "capture ratio" and, according to the current ICAO rules, must not fall below a value of 10 dB along the runway centerline.

The capture effect allows the radiation of the course signal to be restricted to a narrow, obstacle-free angular range on both sides of the centerline and to increase the radiated field strength to the point that interference signals, which may be caused, for example, by reflections of the clearance signal from obstacles located on either side of the runway, will be suppressed. In practice, however, the increase in the power of the course-signal transmitter is limited by the transmitter technology used and by the requirement that interference with the ILS installations of any airport, due to nonstandard propagation, should be avoided.

With the use of larger aircraft and the construction of larger hangars for such aircraft, on the one had, and because of the frequent lack of space, which forces airport planners to place buildings closer to the runway, on the other hand, it is no longer inconceivable that even with the use of two-frequency ILS installations that the standards required by the ICAO for category III might not be met, so that a possibly important airport cannot be approved for category III landings.

Interference due to reflection may, in principle, also occur along the glide path. If two-frequency transmitting apparatus is used to specify a glide path, reflections of the signal radiated into a wider angular range below an elevation plane containing the glide path from large natural or artificial obstacles on the ground may reduce the field-strength ratio required to utilize the capture effect (capture ratio) to the point that a reliable specification of the glide path is endangered by excessive DDM distortions.

To improve the suppression of reflected signals, British Patent 1,062,551, page 2, righthand column, line 91 et seq., for example, proposes that the localizer transmitting apparatus radiates equal audio frequencies (90 Hz and 150 Hz) of the clearance signal and course signal, which are used for modulation, in quadrature, i.e., to shift their phases by 90° with respect to each other.

Such a phase shift of +90° or −90° contravenes the regulations of the ICAO, which, to ensure undisturbed operation of arbitrary receiver types, require common passage of both modulation frequencies through zero in the same direction.

SUMMARY OF THE INVENTION

It is the object of the invention to provide an improved two-frequency transmitting apparatus which is also insensitive to strong reflection-induced interference and meets the relevant regulations of the ICAO.

An apparatus which attains the object of the invention provides different phase shifts of the modulation, frequencies, corresponding to the phase shift of a common fundamental frequency, a suppression of reflected clearance signals is achieved in the region of the runway centerline if the phase shift is introduced in localizer transmitting apparatus, and a corresponding suppression of reflections of the glide-path signal radiated near the ground into the wider angular range is achieved along the slide path if the phase shift is introduced in glide-slope transmitting apparatus. The respective suppression acts in addition to the capture effect in the present invention.

The phase shift is optimizable by measuring the disturbing influence of a transmitted signal thus modulated with out-of-phase audio-frequency signals while changing the phase shift.

Phase shifts of ±15°, ±50°, ±90° ±130° and ±165° provide minimum interference.

Phase shifts of ±15° and ±165° have an added advantage over the other values indicated above in that the influence of deviations from the predetermined optimum phase-shift angle is least there.

BRIEF DESCRIPTION OF THE DRAWINGS

The invention will now be described in detail using a localizer transmitting apparatus as an example.

DETAILED DESCRIPTION

Figure 1:
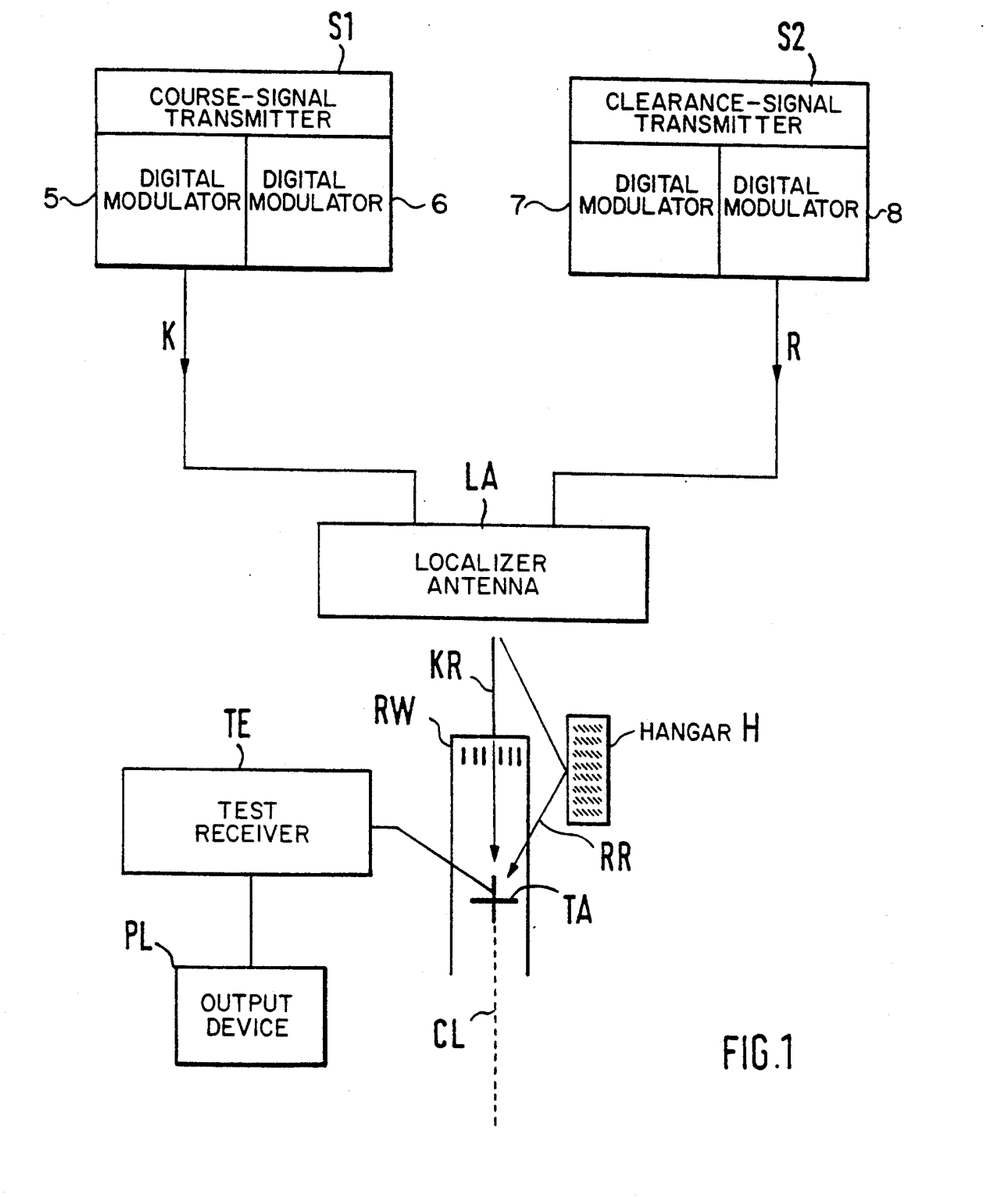
FIG. 1 is a block diagram of a test setup.

FIG. 1 shows schematically the far-end portion of a runway RW with a test receiving antenna TA located on the runway centerline CL. The test receiving antenna is connected to a test receiver TE followed by an output device PL. Located beyond the far end of the runway is a localizer antenna LA for a two-frequency instrument landing system which—unlike in conventional feed systems—is fed here by two separate transmitters S1, S2 which provides the course signal K and the clearance signal R, respectively.

The direction of radiation KR of the sharply focused course signal is the direction of the runway centerline. The clearance signal R is radiated in a wider angle (e.g., 35° on both sides of the runway centerline), and part of the energy is reflected from a hangar H, located in the vicinity of the runway, toward the runway centerline, as indicated by an arrow RR. Part of the clearance signal R is also radiated directly in the direction KR.

Since, in two-frequency instrument landing systems, there is a slight difference between the carrier frequencies of the course transmitter S1 and the clearance transmitter S2, and the field strength of the course transmitter S1 along the runway centerline is higher than that of the clearance transmitter S2, the so-called capture effect normally becomes effective, wherein the course signal K nearly completely suppresses the clearance signal R.

It has turned out, however, that in extreme cases— e.g., if the clearance signal is reflected from large metallic buildings or large aircraft parked near the runway—superpositions of directly radiated and reflected components of the clearance signal R may occur which deteriorate the capture ratio, i.e., the field-strength ratio of the clearance signal R to the course signal K, in the superposition regions to the point that the suppression of the clearance signal R by the capture effect is not sufficient to guarantee that a stable localizer course is specified along the runway centerline (CL). The clearance signal R will interfere with the course signal K which results in one component of the course signal R being weakened or strengthened relative to the other, thus causing a change in the depth of modulation of one audio frequency with respect to that of the other audio frequency after demodulation (DDM distortion). Instead of a straight, stable localizer course, a distorted course line will thus be communicated to the aircraft which does not permit a landing in poor visibility according to ICAO regulations.

The present invention greatly reduces such distortions of the course line by shifting the phase of the audio-frequency signals used to modulate the clearance-signal transmitter S2 with respect to the respective identical audio-frequency signals used to modulate the course signal transmitter S1. The phase shift must be different for each audio frequency (90 Hz and 150 Hz) and must correspond to the same phase angle of a common fundamental frequency (30 Hz) of the two audio frequencies. For a system with audio frequencies of 90 Hz and 150 Hz, a 15° phase shift of the 30-Hz fundamental frequency, for example, corresponds to a 45° phase shift of the 90-Hz audio frequency and to a 75° phase shift of the 150-Hz audio frequency.

Figure 2:
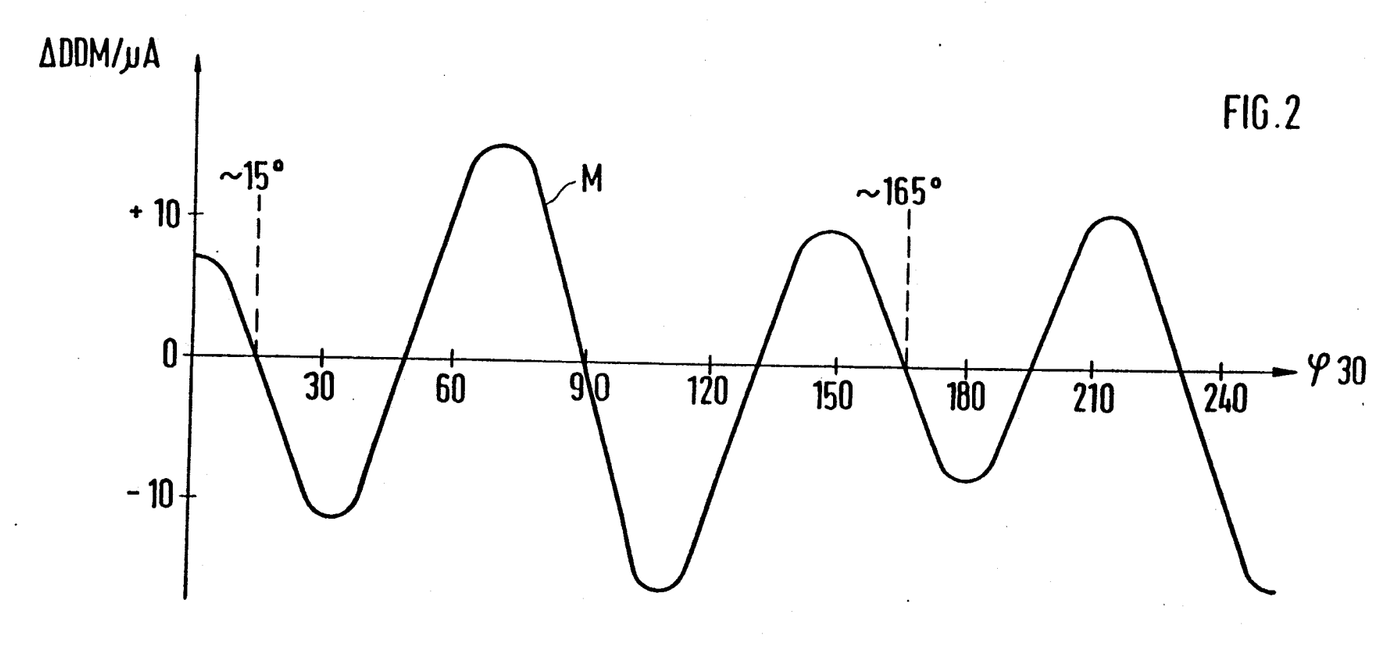
FIG. 2 is a graph representing a typical test result obtained with the transmitting apparatus shown in FIG. 1.

In FIG. 2, distortions of the localizer course (DDM distortions $\Delta DDM$) in such a two-frequency instrument landing system, which are measurable at a point on the runway centerline are plotted as a function of the phase shift $\phi 30$ (on the Abscissa axis) of the 30-Hz fundamental frequency for a field-strength ratio (capture ratio) of 10 dB and a DDM basic value of 200 $\mu A$ for the clearance signal. To adjust the phase shifts necessary for the 90-Hz and 150-Hz audio frequencies, digital modulators 5, 6, 7 and 8 in the two transmitters S1, S2 were so driven in a manner, known per se, that the phase shifts ($3 \times \phi 30$ and $5 \times \phi 30$) corresponding to the currently desired phase shift of the fundamental frequency was obtained for the two audio frequencies. The phase shifts of the two audio frequencies can also be produced, of course, if only one transmitter is employed. This only necessitates giving up the rigid coupling existing in currently available transmitters, which operate without phase shift, between the equal audio-frequency signals used to modulate the clearance signal R and course signal K, and making available the audio-frequency signals separately with the desired phase shift.

FIG. 2 clearly shows that depending on the phase shift of the fundamental frequency, the DDM distorting (curve M) assume different values and repeatedly crosses the value zero. The zero crossing of the curse M are at about ±15, ±50, ±90, ±130, and ±165 degrees. At these zeros, DDM distortions caused by extreme reflections of the clearance signal R are reduced to values far below the limit values prescribed by the ICAO for so-called category III landings (±5 $\mu A$ on the runway).

FIG. 2 also shows that in the case of phase shifts corresponding to 15° and 165° of the 30-Hz fundamental frequency, the curve goes through zero less steeply than at the other zeros. At these points, deviations from the adjusted phase shift, as may be caused, for example, by slight disturbances of synchronism and of the modulator tolerances, result in a smaller increase of DDM distortions than at points where the curve M crosses the zero line very steeply. The greatest tolerance sensitivity would be obtained at $\phi 30 = 90°$.

A phase shift corresponding to one of the above angles of the fundamental frequency, which represent distortion zeros, eliminates the need for many of the conventional, generally expensive or otherwise disadvantageous measures for distortion suppression, and offers the following additional advantages:

For example, a reduction in transmitter power to increase the capture ratio or a reduction of the difference in depth of modulation (DDM) for the clearance signal R can be dispensed with. Even an increase in the DDM minimum value for the clearance signal R is possible without increasing the risk of intolerable DDM distortions of the course signal.

The design of the transmitting antennas need not be adapted to the terrain. Since a higher transmitting power of the clearance signal R is possible, a greater range of the clearance signal at interference minima resulting from the reflections in the far field is achieved. DDM distortions (DDM dips) are also suppressed in the far field of the clearance-signal transmitter through the possible increase in the DDM of the clearance signal R.

Figure 3:
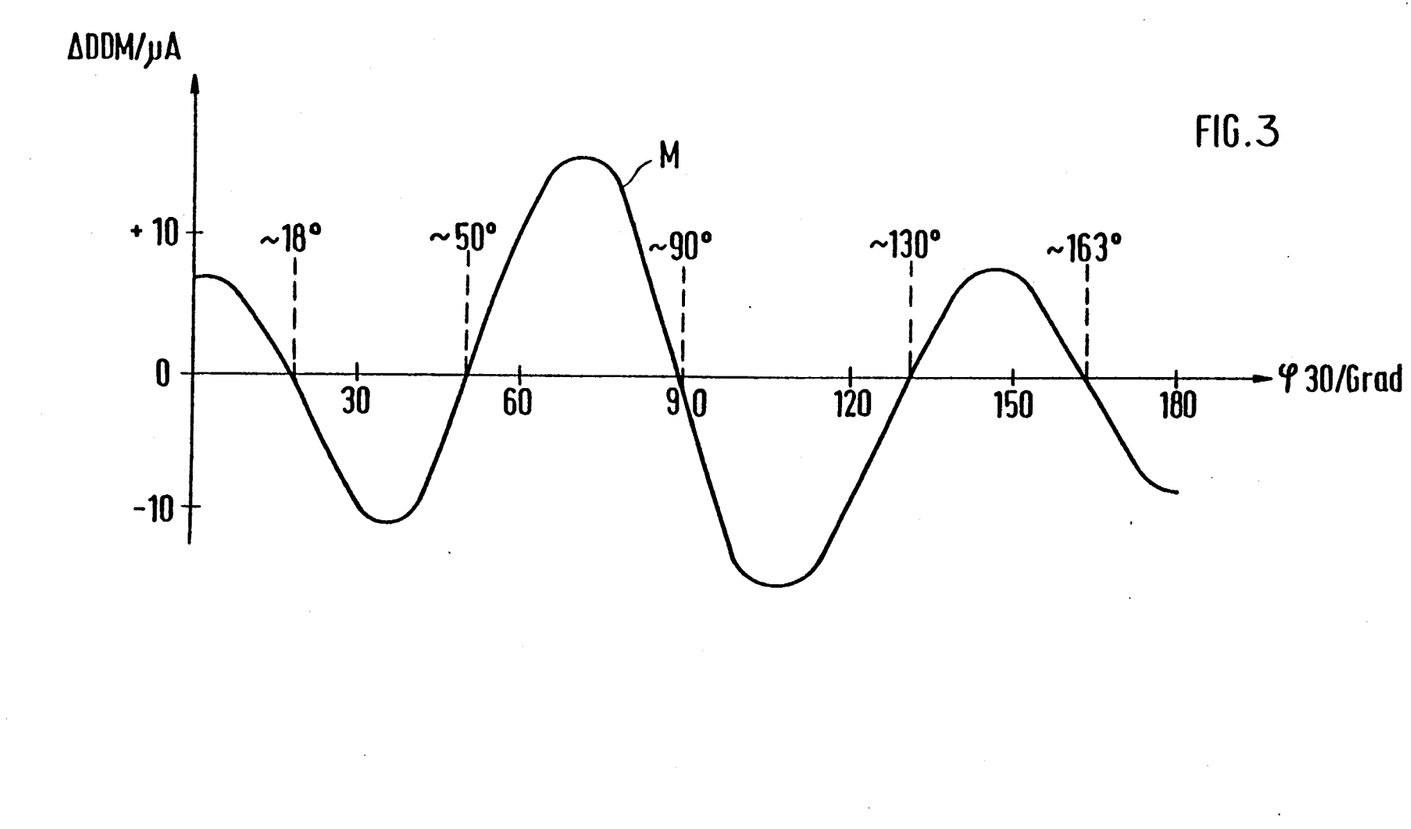

FIG. 3 clearly shows that depending on the phase shift of the fundamental frequency, the DDM distortions (curve M) assume different values, and repeatedly crosses the value zero. The zero crossings of the curve M are at about ±18, ±50, ±90, ±130, and ±163 degrees in FIG. 3.

It has been found that the positions of these zero crossings also depends on the location of the interfering obstacles with respect to the runway centerline (CL), namely whether the obstacles are located on the side on which the 150 Hz modulation predominates, as in the case underlying the curve shown in FIG. 3 or on the side on which the 90 Hz modulation predominates. For the latter case, zero crossings are at phase shifts of the fundamental frequency of ±320°, ±90°, and ±150° (not shown in FIG. 3).

At these zero crossings of curve M, DDM distortions caused by reflections of the clearance signal will, even in an extreme case, be reduced to values far below the limit values prescribed by the ICAO for so-called category III Landings (i.e., ±5 mA on the runway).

FIG. 3 also shows that with phase shifts corresponding to 18° and 163° of the 30 Hz fundamental frequency and with obstacles on the 150 Hz side of the runway centerline, the curve M goes through zero crossings less steeply than at the other zero crossings. At these points, deviations from the phase-shift setting, which may be caused, for example, by slight out-of-sync conditions and variations of the modulator tolerances, result in a smaller increase of DDM distortions than at points where the curve M crosses the zero line very steeply (e.g., $\phi 30 = 90°$). For obstacles on the 90 Hz side, minimally steep zero crossings of curve M are observed at 32° and 150° (not shown in FIG. 3.

A phase shift corresponding to one of the above angles (i.e., 18°, 163°, 32° and 150°) of the fundamental frequency, which represent distortion zeros, eliminates the need for many of the conventional, generally expensive or otherwise disadvantageous measures, for distortion suppression, and offers the following additional advantages, as noted above:

(1) for example, a reduction in transmitter power is possible to increase the capture ratio;
(2) a reduction of the difference in depth of modulation (DDM) for the clearance signal R can be dispensed with;
(3) even an increase in the DDM minimum value for the clearance signal R is possible without increasing the risk of intolerable DDM distortions of the course signal K along the runway;
(4) the design of the transmitting antennas need not be adapted to the terrain;
(5) since a higher transmitting power of the clearance signal R is possible, a greater range of the clearance signal at interference minima (resulting from the reflections in the far field) is achieved; and
(6) DDM distortions (DDM dips) are also reduced in the far field of the clearance-signal transmitter through the possible increase in the DDM of the clearance signal R.

Since strong interference sources (large obstacles reflecting the clearance signal R) are seldom located on both sides of the runway centerline, optimum interference suppression can be achieved by setting a phase difference which corresponds, for example, to a 18° phase shift of the 30 Hz fundamental frequency when interferences are incident from the 150 Hz side, and setting a ±150° phase shift of the 30 Hz fundamental frequency when interferences are incident from the 90 Hz side. Both ±50° and ±163° phase shifts of the 30 Hz fundamental frequency are settable for interferences from the 150 Hz side; phase shifts of ±32° are settable for interferences from the 90 Hz side which are also effective for suppressing interference in the area of the runway. However, problems in the transition region between course signal K and clearance signal R make phase shifts of ±32°, ±50° and ±163° less suitable than the phase shifts specified above (i.e., ±18° and ±150°).

If, in exceptional cases, strong interferences sources are located on both sides of the runway centerline, then a phase difference corresponding to a ±90° phase shift of the 30 Hz fundamental frequency can provide nonoptimum, but sufficient interference suppression, which is equally effective for reflections from both interference sources.

The observed phase-shift values of the common fundamental frequency, which provide DDM interference minima (zero crossings shown in FIG. 3), also apply for the case where exact synchronism exists between the two modulation frequencies. Even slight inaccuracies in synchronization may change the optimum phase-shift values by a few degrees upwards or downwards. Another factor which slightly influences the positions of the optimum phase-shift values is the intensity of the incident interference signal.

Preferably, the transmitting apparatus, according to the present invention, is so designed that besides a setting without phase shift, prepared phase shifts are selectable which correspond to phase shifts of the common 30 Hz fundamental frequency of 18°, 90° and 150°.

Figure 4:
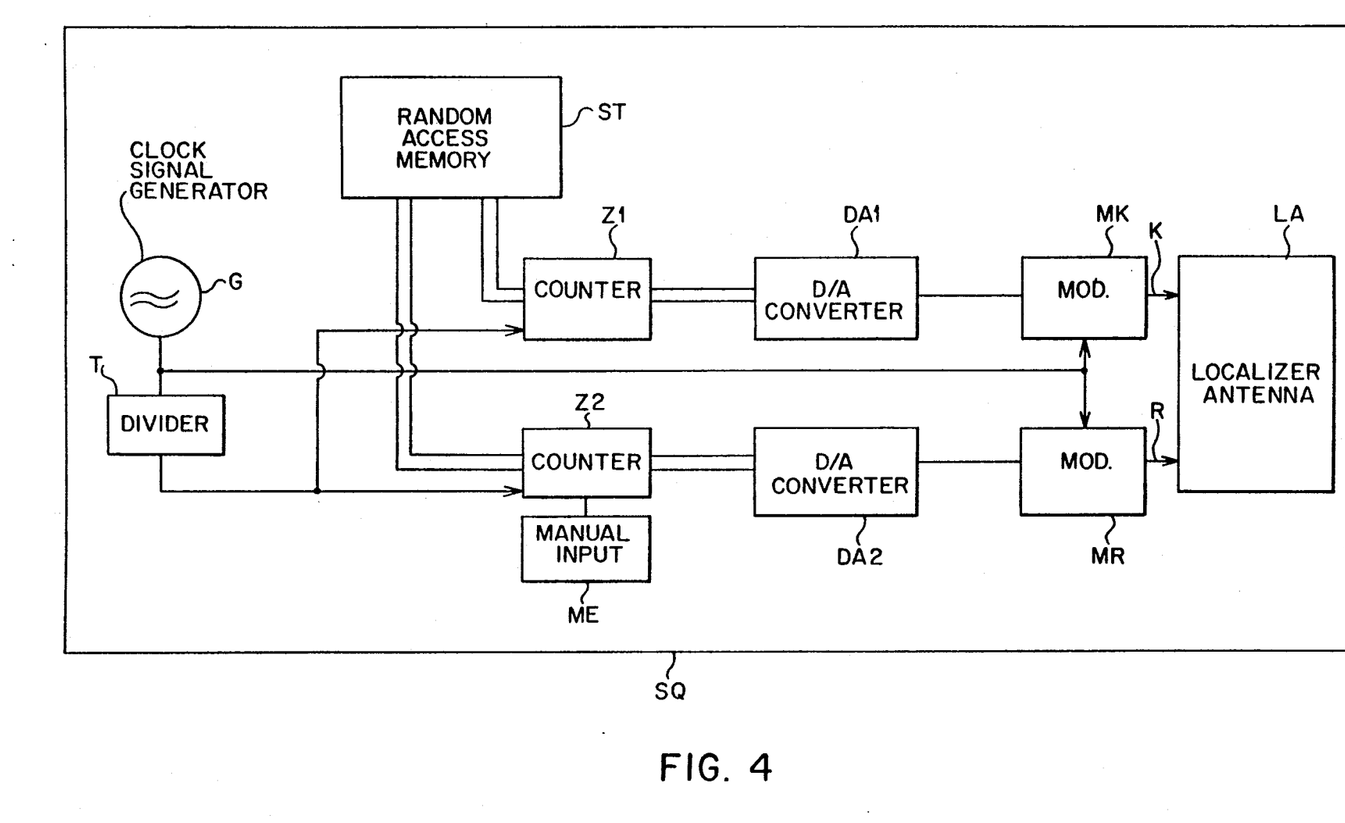

FIG. 4 is a block diagram of a transmitting apparatus which combines the transmitters S1 and S2 shown in FIG. 1 into a single transmitter structure SQ. In FIG. 4, the modulating signal for both the course signal K and the clearance signal R is stored in the RAM (random access memory) ST. The RAM ST may have 1040×11 memory locations. During modulation, the course and clearance modulating signal stored in RAM ST is read out byte by byte, converted to analog signals in digital to analog converters DA1 and DA2, and then fed to two modulators MK(course) and MR(clearance). Readout from the RAM ST is effected by address counters Z1 and Z2 which operate with a presettable time displacement to induce a desired phase shift. To preset the time displacement, one of the counters (Z2) may be presettable counter that is equipped with a manually settable input device ME, for example.

A clock signal from master clock generator G is supplied to both counters Z1, Z2 via a divider (T) which divides down a high transmission frequency generated by master clock generator (G). The undivided clock signal from master clock generator (G) is also provided to modulators MK and MR.

The transmitting apparatus shown in FIG. 4 provides a settable and adjustable phase shift to the modulating signals for the course and clearance signals K and R that are then forwarded to the Localizer Antenna LA which radiates the course signal (K) and the clearance signal (R) in the same manner as described for the Localizer Antenna (LA) shown in FIG. 1.

While the invention has been described with reference to the drawings and structures disclosed therein, it is not confined to details set forth, and is intended to cover modifications or changes as may come within the scope of the following claims.

We claim:

1. A two-frequency transmitting apparatus for an instrument landing system defining an approach path for landing aircraft, comprising:

first and second transmitters (S1, S2) which operate with a small frequency difference in their radio frequency carrier signals (K, R);

said first and second transmitters each including modulating means for amplitude-modulating said carrier signals (K, R) with first and second different (90 Hz, 150 Hz), synchronized audio-frequency signals which are fed to said transmitters out of phase with respect to each other, said first and second audio-frequency signals having a common fundamental frequency;

an antenna array (LA) for radiating the amplitude modulated carrier signals in a direction opposite to a direction of approach of an aircraft, into two angular ranges of different widths, said two angular ranges being located respectively on opposite sides of a plane containing the approach path of the aircraft, such that a field strength of one (S1) of the transmitters (S1, S2) predominates in a narrower one of said angular ranges, while a field strength of the other transmitter (S2) predominates in an other wider one of said angular ranges;

the amplitude modulated carrier signals from the two transmitters being received on both sides of said plane with different depths of modulation, depending on the direction of radiation and decreasing in a direction of said plane, with a depth of modulation of one of said first and second audio-frequency signals (90 Hz and 150 Hz) predominating on one side of said plane, and a depth of modulation of the other one of said first and second audio-frequency signals predominating on the other side of said plane; and a phase difference between a phase position of each of the equal-frequency audio-frequency signals (90 Hz or 150 Hz) used to respectively modulate each of the carrier signals (K, R) radiated by the transmitters, is different for the two audio-frequency signals (90 Hz, 150 Hz) and corresponding to a predetermined phase shift ($\phi$30) of said common fundamental frequency (30 Hz) which is common to said first and second audio-frequency signals (90 Hz, 150 Hz).

2. A two-frequency transmitting apparatus as claimed in claim 1, wherein:

the phase-shifted audio-frequency signals (90 Hz or 150 Hz) modulating the carrier signals, respectively have a predetermined phase position to provide said phase difference; and wherein the predetermined phase shift ($\phi$30) of the common fundamental frequency is so selected that the influence of the carrier signal on the difference (DMM) in depth of modulation is a minimum.

3. A two-frequency transmitting apparatus as claimed in claim 1, wherein said predetermined phase shift of said common fundamental frequency is one of $\pm15°$, $\pm50°$, $\pm90°$ $\pm130°$ and $\pm165°$.

4. A two-frequency transmitting apparatus as claimed in claim 3, wherein said predetermined phase shift of said common fundamental frequency is one of $\pm15°$ and $\pm165°$.

5. A two-frequency transmitting apparatus as claimed in claim 2, wherein said predetermined phase shift of said common fundamental frequency is one of $\pm15°$, $\pm50°$, $\pm90°$ $\pm130°$ and $\pm165°$.

6. A two-frequency transmitting apparatus as claimed in claim 5, wherein said predetermined phase shift of said common fundamental frequency is one of $\pm15°$ and $\pm165°$.

7. A two-frequency transmitting apparatus as claimed in claim 1, wherein:

said predetermined phase shift of said common fundamental frequency is one of $\pm90°$ and $\pm150°$ for reducing an interference signal that is received on said one side of said plane where said depth of modulation of said first (90 Hz) audio frequency of said first and second audio frequencies (90 Hz and 150 Hz) predominates; and said predetermined phase shift of said common fundamental frequency is one of $\pm18°$ $\pm90°$ and $\pm130°$, for reducing an interference signal that is received on said another side of said plane where said depth of modulation of said second (150 Hz) audio frequency of said first and second audio frequencies (90 Hz and 150 Hz) predominates.

8. A two-frequency transmitting apparatus according to claim 7, wherein said predetermined phase shift of said common fundamental frequency is one of $\pm18°$ and $\pm150°$.

9. A two-frequency transmitting apparatus according to claim 7, wherein said first and second transmitters (S1, S2) are included in a common transmitter structure (SQ).

10. A two-frequency transmitting apparatus according to claim 9, further comprising:

setting means (Z1, Z2) for setting a plurality of phase shifts of said first and second audio frequencies, corresponding to at least one pair of said predetermined phase shifts of said common fundamental frequency (30 Hz), in said common transmitter structure (SQ); and selecting means (ME) for selecting a pair of predetermined phase shifts of said common fundamental frequency (30 Hz) set by said setting means.

11. A two-frequency transmitting apparatus according to claim 1, wherein said first and second transmitters (S1, S2) are included in a common transmitter structure (SQ).

12. A two-frequency transmitting apparatus according to claim 11, further comprising:

setting means (Z1, Z2) for setting a plurality of phase shifts of said first and second audio frequencies, corresponding to at least one pair of said predetermined phase shifts of said common fundamental frequency (30 Hz), in said common transmitter structure (SQ); and selecting means (ME) for selecting a pair of predetermined phase shifts of said common fundamental frequency (30 Hz) set by said setting means.

13. A two-frequency transmitting apparatus according to claim 2, wherein said first and second transmitters (S1, S2) are included in a common transmitter structure (SQ).

14. A two-frequency transmitting apparatus according to claim 13, further comprising:

setting means (Z1, Z2) for setting a plurality of phase shifts of said first and second audio frequencies, corresponding to at least one pair of said predetermined phase shifts of said common fundamental frequency (30 Hz), in said common transmitter structure (SQ); and selecting means (ME) for selecting a pair of predetermined phase shifts of said common fundamental frequency (30 Hz) set by said setting means.

15. A two-frequency transmitting apparatus as claimed in claim 2, wherein:

said predetermined phase shift of said common fundamental frequency is one of ±90° and ±150° for reducing an interference signal that is received on said one side of said plane where said depth of said modulation of said first (90 Hz) audio frequency of said first and second audio frequencies (90 Hz and 150 Hz) predominates; and said predetermined phase shift of said common fundamental frequency is one of ±18° ±90° and ±130°, for reducing an interference signal that is received on said another side of said plane where said depth of modulation of said second (150 Hz) audio frequency of said first and second audio frequencies (90 Hz and 150 Hz) predominates.

16. A two-frequency transmitting apparatus according to claim 15, wherein said predetermined phase shift of said common fundamental frequency is one of ±18° and ±150°.

17. A two-frequency transmitting apparatus according to claim 15, wherein said first and second transmitters (S1, S2) are included in a common transmitter structure (ST).

18. A two-frequency transmitting apparatus according to claim 17, further comprising:

setting means (Z1, Z2) for setting a plurality of phase shifts of said first and second audio frequencies, corresponding to at least one pair of said predetermined phase shifts of said common fundamental frequency (30 Hz), in said common transmitter structure (SQ); and selecting means (ME) for selecting a pair of predetermined phase shifts of said common fundamental frequency (30 Hz) set by said setting means.

19. A two-frequency transmitting apparatus according to claim 16, wherein said first and second transmitters (S1, S2) are included in a common transmitter structure (ST).

20. A two-frequency transmitting apparatus according to claim 19, further comprising:

setting means Z1, Z2 for setting a plurality of phase shifts of said first and second audio frequencies, corresponding to at least one pair of said predetermined phase shifts of said common fundamental frequency (30 Hz), in said common transmitter structure (SQ); and selecting means (ME) for selecting a pair of predetermined phase shifts of said common fundamental frequency (30 Hz).

* * * * *

UNITED STATES PATENT AND TRADEMARK OFFICE
CERTIFICATE OF CORRECTION

PATENT NO. : 5,323,165
DATED : June 21, 1994
INVENTOR(S) : GREVING et al.

It is certified that error appears in the above-indentified patent and that said Letters Patent is hereby corrected as shown below:

Title page, Item [73] Assignee, change "Sel" to --SEL--

Signed and Sealed this

First Day of July, 1997

Attest:

Attesting Officer

BRUCE LEHMAN
Commissioner of Patents and Trademarks